(12) United States Patent
Amano et al.

(10) Patent No.: US 12,474,446 B2
(45) Date of Patent: Nov. 18, 2025

(54) OCCUPANT DETECTION DEVICE, METHOD, AND PROGRAM

(71) Applicant: AISIN CORPORATION, Aichi (JP)

(72) Inventors: Jun Amano, Kariya (JP); Toru Uematsu, Kariya (JP); Ryohei Fuwa, Kariya (JP); Asami Yamazaki, Aichi-ken (JP); Takayuki Nakagome, Kariya (JP); Masafumi Yaegashi, Kariya (JP)

(73) Assignee: AISIN CORPORATION, Aichi (JP)

( * ) Notice: Subject to any disclaimer, the term of this patent is extended or adjusted under 35 U.S.C. 154(b) by 317 days.

(21) Appl. No.: 17/747,032

(22) Filed: May 18, 2022

(65) Prior Publication Data

US 2022/0397643 A1 Dec. 15, 2022

(30) Foreign Application Priority Data

Jun. 9, 2021 (JP) ................. 2021-096864

(51) Int. Cl.
  *G01S 7/41* (2006.01)
  *G01S 13/87* (2006.01)
  *G01S 13/89* (2006.01)

(52) U.S. Cl.
  CPC ............. *G01S 7/411* (2013.01); *G01S 13/874* (2013.01); *G01S 13/89* (2013.01)

(58) Field of Classification Search
  CPC ........ G01S 7/411; G01S 13/874; G01S 13/89; G01S 13/931; G01S 7/41–7/415; G01S 13/04; G01S 13/06
  See application file for complete search history.

(56) References Cited

U.S. PATENT DOCUMENTS

| 3,740,096 A | * | 6/1973 | Bridger | ................ | A47C 7/029 |
| | | | | | 297/452.33 |
| 5,822,707 A | * | 10/1998 | Breed | .................. | B60N 2/067 |
| | | | | | 296/65.18 |
| 6,422,595 B1 | * | 7/2002 | Breed | .............. | B60R 21/01534 |
| | | | | | 701/45 |

(Continued)

FOREIGN PATENT DOCUMENTS

| EP | 3632741 A1 | * | 4/2020 | ........... B60N 2/0244 |
| JP | 2006-081771 A | | 3/2006 | |

(Continued)

*Primary Examiner* — Peter M Bythrow
(74) *Attorney, Agent, or Firm* — Sughrue Mion, PLLC

(57) ABSTRACT

An occupant detection device includes: a radio wave sensor located above a seat surface of a seat that is disposed in a vehicle cabin of a vehicle, in a vertical direction of the vehicle, and including a transmission unit configured to transmit a transmission wave to the vehicle cabin and a reception unit configured to receive a reflected wave generated by the transmission wave being reflected by an occupant on the seat; a creation unit configured to create, based on the reflected wave, three-dimensional map information in the vehicle cabin in which a position of a reflection point of the reflected wave is represented by three-dimensional coordinates; and a calculation unit configured to calculate, based on the three-dimensional map information, backbone information that is information on a backbone of the occupant on the seat.

6 Claims, 8 Drawing Sheets

(56) References Cited

U.S. PATENT DOCUMENTS

| | | | |
|---|---|---|---|
| 2002/0130804 A1* | 9/2002 | McMakin | G06V 40/103 342/60 |
| 2008/0157940 A1* | 7/2008 | Breed | B60N 2/0035 340/425.5 |
| 2008/0234899 A1* | 9/2008 | Breed | B60N 2/0278 701/1 |
| 2019/0239815 A1* | 8/2019 | Gallagher | G01S 7/415 |
| 2019/0266425 A1* | 8/2019 | Iwai | G06T 7/73 |
| 2019/0277947 A1* | 9/2019 | Abe | G01S 7/4802 |
| 2020/0090299 A1 | 3/2020 | Uno et al. | |
| 2021/0001796 A1 | 1/2021 | Kudo et al. | |
| 2021/0048511 A1* | 2/2021 | Xie | G01S 7/415 |
| 2022/0381881 A1* | 12/2022 | Kawamura | G01S 7/415 |
| 2022/0388525 A1* | 12/2022 | Roberts | B60W 50/14 |

FOREIGN PATENT DOCUMENTS

| | | | | |
|---|---|---|---|---|
| JP | 2006-185166 A | | 7/2006 | |
| JP | 2013228334 A | * | 11/2013 | |
| JP | 2018-202921 A | | 12/2018 | |
| JP | 2018-205175 A | | 12/2018 | |
| JP | 2019-197278 A | | 11/2019 | |
| JP | 2020-47273 A | | 3/2020 | |
| JP | 2021-032879 A | | 3/2021 | |
| JP | 2022076392 A | * | 5/2022 | G01S 13/56 |
| WO | WO-2019022237 A1 | * | 1/2019 | A47C 7/02 |
| WO | 2019/180876 A1 | | 9/2019 | |

\* cited by examiner

OCCUPANT DETECTION DEVICE, METHOD, AND PROGRAM

CROSS REFERENCE TO RELATED APPLICATIONS

This application is based on and claims priority under 35 U.S.C. § 119 to Japanese Patent Application 2021-096864, filed on Jun. 9, 2021, the entire content of which is incorporated herein by reference.

TECHNICAL FIELD

This disclosure relates to an occupant detection device, a method, and a program.

BACKGROUND DISCUSSION

In the related art, there is a technique for emitting a radio wave to a person and detecting a posture, a physique, and the like of the person based on a reflected wave of the radio wave reflected by the person.

Examples of the related art include JP 2006-81771A and JP 2021-32879A.

It is beneficial to obtain a novel occupant detection device, a method, and a program capable of detecting information on a body of an occupant on a seat in a vehicle cabin of a vehicle using this type of technique.

A need thus exits for a novel occupant detection device, a method, and a program which are not susceptible to the drawback mentioned above.

SUMMARY

An occupant detection device according to an embodiment includes: a radio wave sensor located above a seat surface of a seat that is disposed in a vehicle cabin of a vehicle, in a vertical direction of the vehicle, and including a transmission unit configured to transmit a transmission wave to the vehicle cabin and a reception unit configured to receive a reflected wave generated by the transmission wave being reflected by an occupant on the seat; a creation unit configured to create, based on the reflected wave, three-dimensional map information in the vehicle cabin in which a position of a reflection point of the reflected wave is represented by three-dimensional coordinates; and a calculation unit configured to calculate, based on the three-dimensional map information, backbone information that is information on a backbone of the occupant on the seat.

A method according to an embodiment is a method to be executed by an occupant detection device, the occupant detection device includes: a radio wave sensor located above a seat surface of a seat that is disposed in a vehicle cabin of a vehicle, in a vertical direction of the vehicle, and including a transmission unit configured to transmit a transmission wave to the vehicle cabin and a reception unit configured to receive a reflected wave generated by the transmission wave being reflected by an occupant on the seat, and the method includes: a step of creating, based on the reflected wave, three-dimensional map information in the vehicle cabin in which a position of a reflection point of the reflected wave is represented by three-dimensional coordinates; and a step of calculating, based on the three-dimensional map information, backbone information that is information on a backbone of the occupant on the seat.

A program according to an embodiment causes a computer of an occupant detection device including a radio wave sensor located above a seat surface of a seat that is disposed in a vehicle cabin of a vehicle, in a vertical direction of the vehicle, and including a transmission unit configured to transmit a transmission wave to the vehicle cabin and a reception unit configured to receive a reflected wave generated by the transmission wave being reflected by an occupant on the seat, to function as a creation unit configured to create, based on the reflected wave, three-dimensional map information in the vehicle cabin in which a position of a reflection point of the reflected wave is represented by three-dimensional coordinates, and a calculation unit configured to calculate, based on the three-dimensional map information, backbone information that is information on a backbone of the occupant on the seat.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
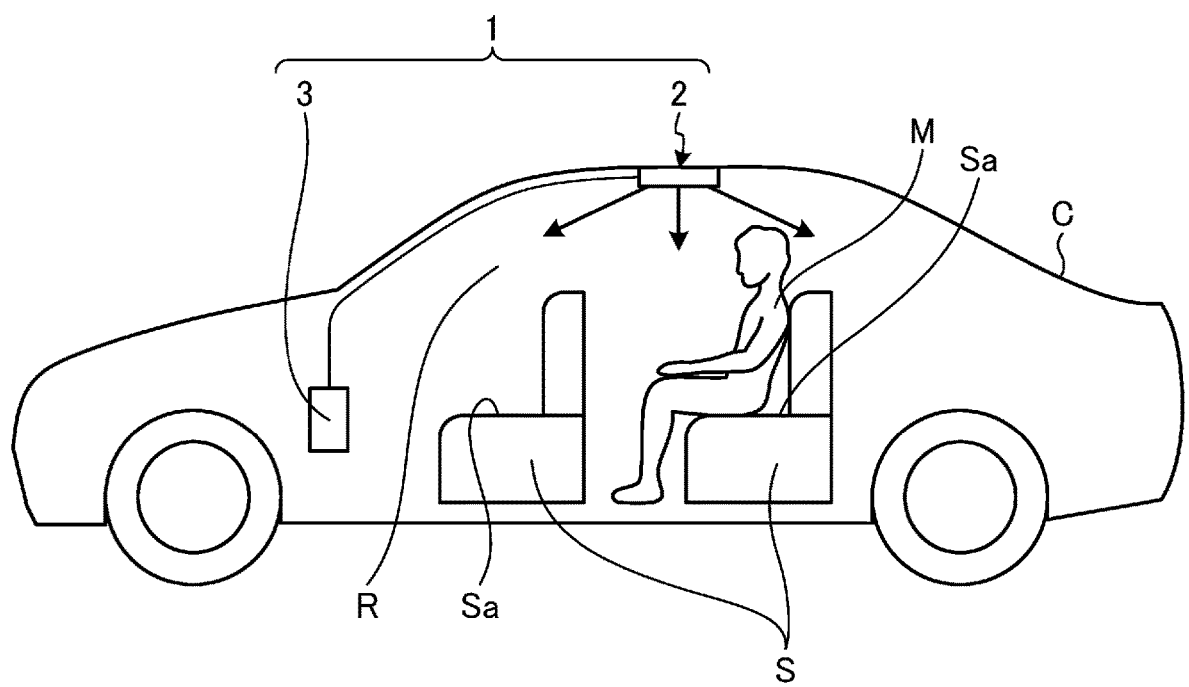
FIG. 1 is a schematic diagram of a vehicle according to a first embodiment.

Hereinafter, embodiments will be described in detail with reference to the drawings. The embodiments disclosed here is not limited by this embodiment.

The following embodiments include the same components. Those same components are denoted by the same reference numerals, and redundant description thereof is omitted. In addition, the drawings are schematic, and a relationship of dimensions of each element, a ratio of each element, and the like may be different from actual ones.

First Embodiment

FIG. 1 is a schematic diagram of a vehicle C according to a first embodiment. A radio wave sensor 2 and a control device 3 constituting an occupant detection device 1 are disposed in a vehicle cabin R of the vehicle C. The radio wave sensor 2 is installed at a ceiling portion in the vehicle cabin R. The control device 3 is installed, for example, in a dashboard provided at a front end portion in the vehicle cabin R.

In the vehicle cabin R of the vehicle C, a plurality of seats S on which an occupant M can sit are provided. FIG. 1 illustrates a configuration in which the seats S are arranged in two rows (a front row and a rear row). The seats S are not limited to the above configuration. For example, the seats S may be arranged in one row or three or more rows.

Figure 2:
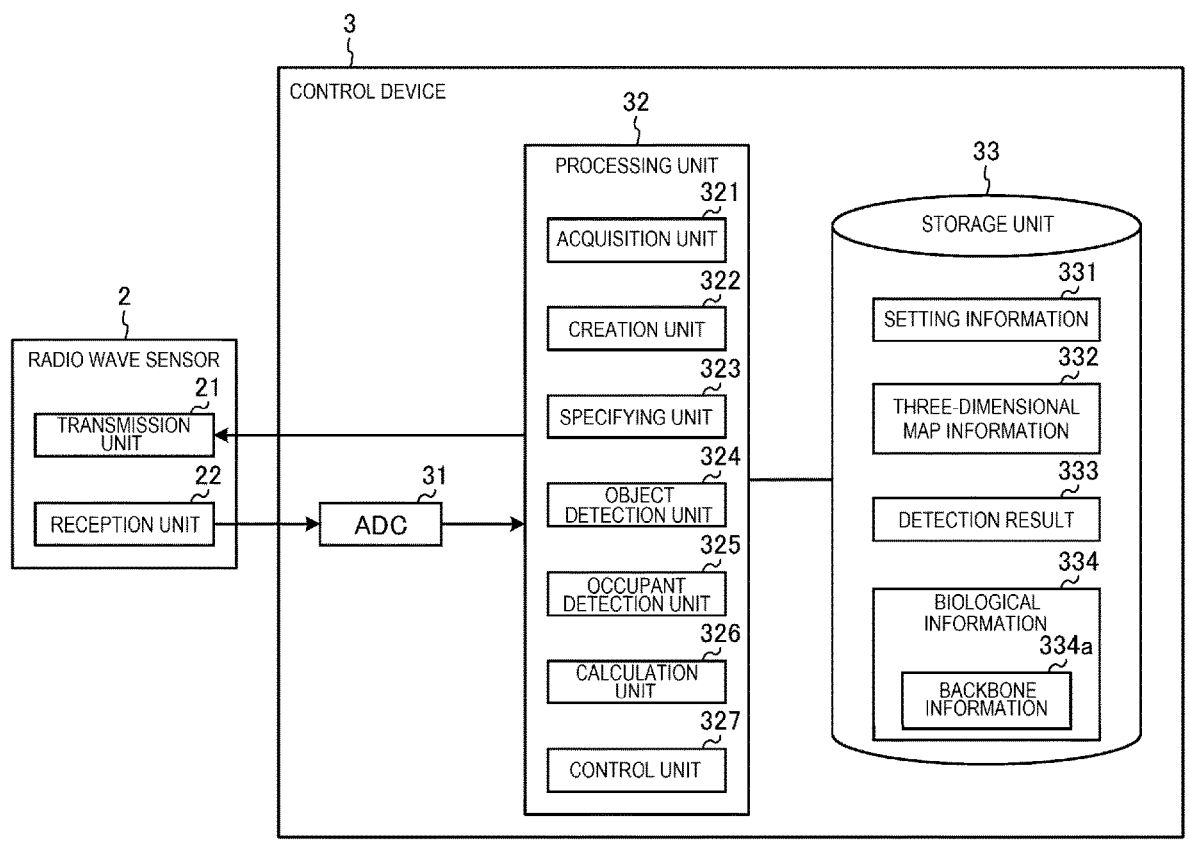
FIG. 2 is a block diagram illustrating a functional configuration of a radio wave sensor and a control device according to the first embodiment.

FIG. 2 is a block diagram illustrating a functional configuration of the radio wave sensor 2 and the control device 3 according to the embodiment. The radio wave sensor 2 includes a transmission unit 21 and a reception unit 22.

The transmission unit 21 transmits (emits) a transmission wave over a wide range into the vehicle cabin R of the vehicle C. The transmission wave is, for example, a radio wave (microwave) obtained through frequency modulated continuous wave (FMCW) modulation. The reception unit 22 receives a reflected wave generated by the transmission wave being reflected by an object in the vehicle cabin R. The reception unit 22 includes a plurality of receiving antennas. Here, when the transmitted radio wave comes into contact with the occupant M that can be present in the vehicle cabin R, the transmitted radio wave is reflected by the occupant M, and a frequency thereof is shifted in proportion to a moving speed (for example, a moving speed of a body surface such as breathing or heartbeat) of the occupant M due to a Doppler effect when the occupant M moves. Therefore, when the reflected wave received by the reception unit 22 is frequency-shifted, a Doppler signal indicating a possibility of the presence of the occupant M in the vehicle cabin R is received. Therefore, the occupant M can be detected based on a detection result 333 of an object detection unit 324.

In the radio wave sensor 2, the transmission unit 21 and the reception unit 22 may be integrated, or may be configured individually. Further, in a case of FIG. 1, one radio wave sensor 2 is installed so as to be able to detect all occupants M that may be present in the vehicle cabin R, but in another embodiment, the vehicle cabin R may be divided into a plurality of regions, and the radio wave sensor 2 may be provided in each region. For example, the radio wave sensor 2 may be provided for each row of the seats S.

The control device 3 is implemented by, for example, a micro controller unit (MCU) including an integrated circuit in which a hardware processor, a memory, and the like are mounted. The control device 3 includes an analog-to-digital converter (ADC) 31, a processing unit 32, and a storage unit 33.

The ADC 31 converts an analog signal acquired from the reception unit 22 of the radio wave sensor 2 into a digital signal and outputs the digital signal to the processing unit 32.

The storage unit 33 is, for example, a storage device such as a random access memory (RAM), a read only memory (ROM), a solid state drive (SSD), or a hard disk drive (HDD). The storage unit 33 stores a program to be executed by the processing unit 32, data required for executing the program, data generated by executing the program, and the like. The storage unit 33 stores, for example, setting information 331, three-dimensional map information 332, the detection result 333, and biological information 334.

The setting information 331 stores various kinds of setting information such as a frequency range for determining whether a signal is a biological signal of the occupant M, and various thresholds (a reflection source threshold for specifying a reflection source, an occupant threshold for detecting the occupant M, and the like).

The three-dimensional map information 332 is information indicating a three-dimensional object arrangement state in the vehicle cabin R, which is created by a creation unit 322 based on reflected wave information.

The detection result 333 is information of the detection result from the object detection unit 324.

The biological information 334 is the biological information of the occupant M calculated by a calculation unit 326.

Here, a signal processing performed by an FMCW method is as follows. First, a transmission wave obtained through FMCW modulation is transmitted from the transmission unit 21 of the radio wave sensor 2 into the vehicle cabin R of the vehicle C. Then, the reception unit 22 of the radio wave sensor 2 receives the reflected wave.

Next, the creation unit 322 creates the three-dimensional map information in the vehicle cabin R based on the reflected wave. In addition to the occupant M, the three-dimensional map information includes information on an object (reflection source) such as a metal having a high reflectance. That is, it is not possible to distinguish whether a recognized object is a metal or a person based on the three-dimensional map information alone.

Next, the occupant M is detected by an object detection that is based on a Doppler shift of the reflected wave and that is performed by the object detection unit 324 and a person detection performed by an occupant detection unit 325. In addition, the biological information of the occupant M is calculated by the calculation unit 326. The biological information includes information on a body of the occupant M, more specifically, information on a backbone of the occupant M. Hereinafter, a processing of the processing unit 32 will be described in detail.

The processing unit 32 includes, for example, a hardware processor such as a central processing unit (CPU). The processing unit 32 reads a program stored in the storage unit 33 and executes an arithmetic processing. The processing unit 32 includes, as functional units, an acquisition unit 321, the creation unit 322, a specifying unit 323, the object detection unit 324, the occupant detection unit 325, the calculation unit 326, and a control unit 327. A part of or all of the units 321 to 327 may be configured by hardware such as a circuit including an application specific integrated circuit (ASIC) or a field-programmable gate array (FPGA).

The acquisition unit 321 acquires the reflected wave information from the ADC 31.

The creation unit 322 creates the three-dimensional map information in the vehicle cabin R based on the reflected wave information, that is, the reflected wave, and stores the created three-dimensional map information in the storage unit 33 as the three-dimensional map information 332.

Figure 3:
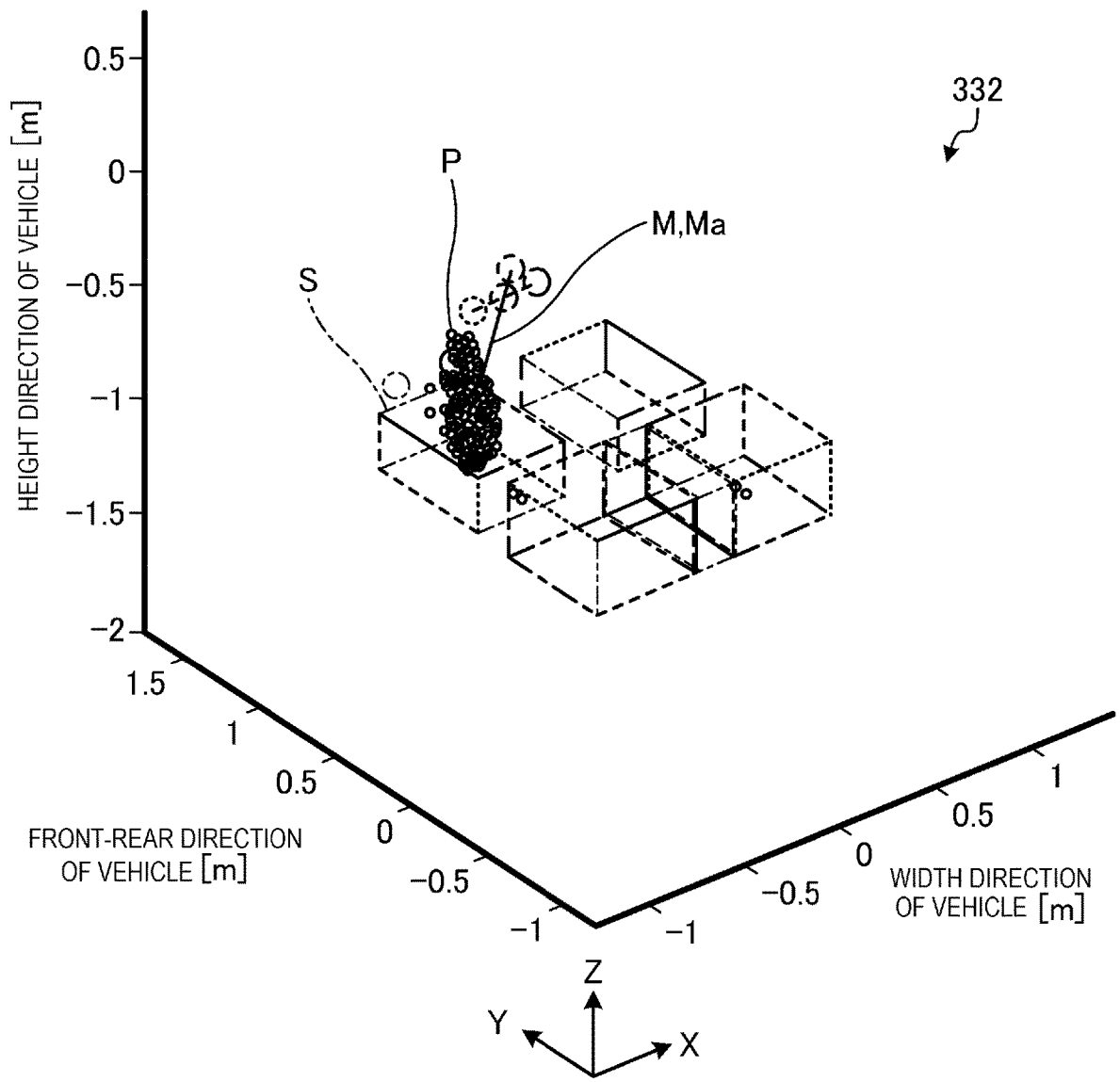
FIG. 3 is a schematic diagram of three-dimensional map information according to the first embodiment.
Figure 4:
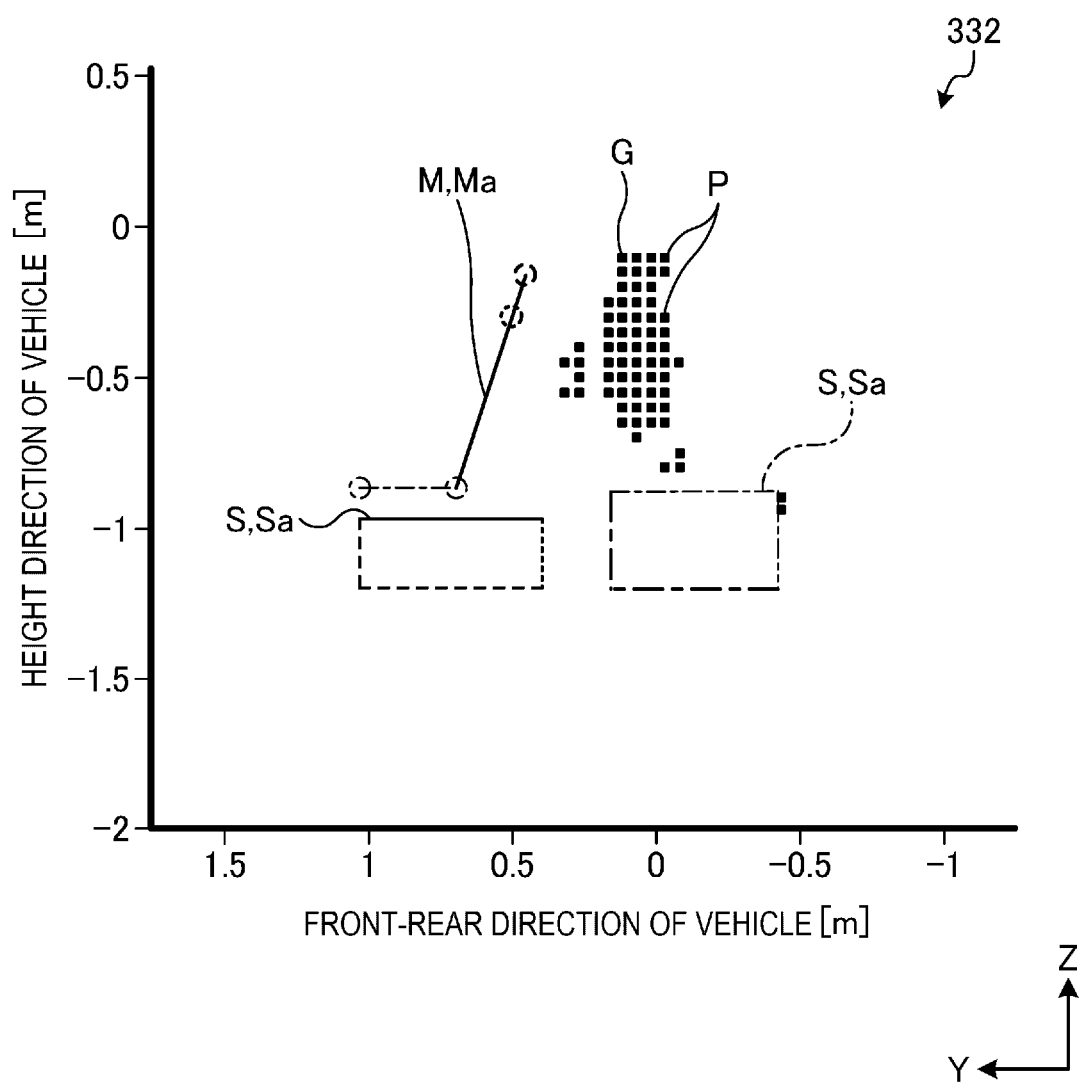
FIG. 4 is a schematic diagram of a part of the three-dimensional map information according to the first embodiment.

FIG. 3 is a schematic diagram of the three-dimensional map information 332 according to the first embodiment. FIG. 4 is a schematic diagram of a part of the three-dimensional map information 332 according to the first embodiment. As illustrated in FIGS. 3 and 4, the three-dimensional map information 332 includes information in which a position of a reflection point P of the reflected wave reflected by the occupant M is represented by three-dimensional coordinates. The three-dimensional coordinates include an X axis, a Y axis, and a Z axis. The X axis, the Y axis, and the Z axis are orthogonal to one another. Directions indicated by the X axis, the Y axis, and the Z axis are referred to as an X direction, a Y direction, and a Z direction, respectively. The X axis (X direction) is along a width direction of the vehicle C. The Y axis is along a front-rear direction of the vehicle C, and the Y direction coincides with a front side of the vehicle C in the front-rear direction. The Z axis is along a vertical direction of the vehicle C, and the Z direction coincides with an upper side of the vehicle C in the vertical direction. The three-dimensional map information 332 includes intensity information indicating an intensity of the reflected wave corresponding to the reflection point P. The three-dimensional map information 332 includes positions of seat surfaces Sa of the seats S. FIGS. 3 and 4 schematically illustrate skeleton of the occupant M seated on a certain seat S. The skeleton of the occupant M is illustrated to indicate a relationship between the certain seat S and the occupant M, and is not included in the three-dimensional map information 332.

The specifying unit 323 specifies a position of the reflection source in the three-dimensional map information 332.

The object detection unit 324 detects movement of the object in the vehicle cabin R based on the Doppler shift of the reflected wave, and stores a detection result in the storage unit 33 as the detection result 333.

The occupant detection unit 325 detects one or more occupants M based on the setting information 331, the three-dimensional map information 332, and the detection result 333. The occupant detection unit 325 detects the occupant M for each seat S.

The calculation unit 326 calculates backbone information 334a, which is information on a backbone Ma (see FIG. 4) of the occupant M on the seat S, based on the three-dimensional map information 332. The backbone information 334a includes at least one (as an example, both) of a length of the backbone Ma and an extending direction of the backbone Ma.

Figure 5:
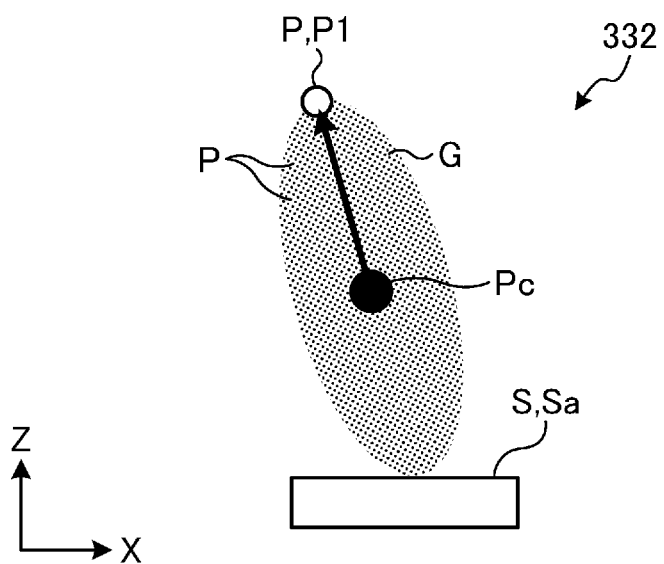
FIG. 5 is a diagram illustrating a method of calculating backbone information according to the first embodiment.

FIG. 5 is a diagram illustrating a method of calculating the backbone information 334a according to the first embodiment. As illustrated in FIG. 5, the calculation unit 326 calculates the backbone information 334a based on a gravity center position Pc of the intensity of the reflected wave in a point group G, which is a group of a plurality of reflection points P, and a position of an upper point P1 located uppermost in the vertical direction of the vehicle C in the point group G. Specifically, the calculation unit 326 calculates a line L1 connecting the gravity center position Pc and the position of the upper point P1. The calculation unit 326 regards a length of the line L1 as the length of the backbone Ma, and regards a direction from the gravity center position Pc toward the upper point P1 in the line L1 as the extending direction of the backbone Ma. Here, the point group G includes, for example, a plurality of reflection points P at the positions of the seat surfaces Sa of the seats S and the positions above the seat surfaces Sa in the vertical direction of the vehicle C. In FIG. 5, the reflection points P of the gravity center position Pc and the upper point P1 is shown larger than other reflection points P in order to facilitate understanding.

The control unit 327 executes a calculation other than the calculation executed by each of the units 321 to 327.

Figure 6:
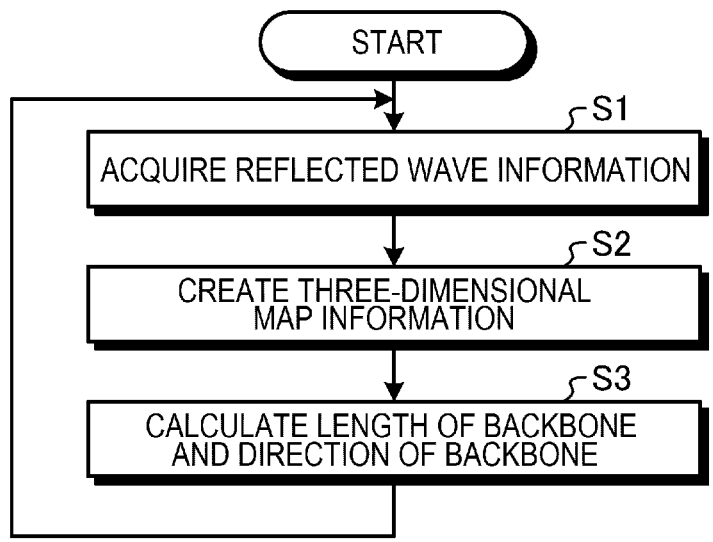
FIG. 6 is a flowchart illustrating a processing performed by the control device according to the first embodiment.

FIG. 6 is a flowchart illustrating a processing performed by the control device 3 according to the embodiment. First, the acquisition unit 321 acquires the reflected wave information from the ADC 31 (S1). Next, the creation unit 322 creates the three-dimensional map information 332 based on the reflected wave information (S2). Next, the calculation unit 326 calculates, as the backbone information 334a, the length of the backbone Ma and the extending direction of the backbone Ma based on the three-dimensional map information 332 (S3).

As described above, in the first embodiment, the occupant detection device 1 includes the radio wave sensor 2, the creation unit 322, and the calculation unit 326. The radio wave sensor 2 is located above, in the vertical direction of the vehicle C, the seat surfaces Sa of the seats S arranged in the vehicle cabin R of the vehicle C. The radio wave sensor 2 includes the transmission unit 21 that transmits the transmission wave into the vehicle cabin R, and the reception unit 22 that receives the reflected wave generated by the transmission wave being reflected by the occupant M on the seat S. The creation unit 322 creates the three-dimensional map information 332 in the vehicle cabin R in which the position of the reflection point P of the reflected wave is represented by the three-dimensional coordinates based on the reflected wave. The calculation unit 326 calculates the backbone information 334a, which is the information on the backbone Ma of the occupant M on the seat S, based on the three-dimensional map information 332.

According to such a configuration, since the information on the backbone Ma is calculated, that is, detected as the information on the body of the occupant M on the seat S by the calculation unit 326, a posture and a physique of the occupant M can be grasped based on the information on the backbone Ma. Therefore, control related to an occupant protection corresponding to the posture and the physique of the occupant M can be performed.

In the occupant detection device 1, for example, the backbone information 334a includes at least one of the length of the backbone Ma and the extending direction of the backbone Ma.

According to such a configuration, since the length of the backbone Ma corresponds to a sitting height of the occupant M, and the sitting height of the occupant M corresponds to the physique of the occupant M, when the length of the backbone Ma of the occupant M on the seat S is calculated, the physique of the occupant M can be grasped based on the length of the backbone Ma. Therefore, for example, as the control related to the occupant protection, deployment control of an airbag during a collision of the vehicle C and fastening control of a seat belt during the collision of the vehicle C can be performed. As can be seen from the above, coordinates are indices for grasping (recognizing) the physique. In addition, since the extending direction of the backbone Ma is a direction corresponding to the posture of the occupant M (a posture of leaning forward, a posture of sitting and leaning to the left or right, or the like), when the extending direction of the backbone Ma is calculated, the posture of the occupant M can be grasped based on the extending direction of the backbone Ma. Therefore, for example, as the control related to the occupant protection, control on a shape of the seat S (such as an inclination angle of the seat surface Sa) can be performed in order to reduce an impact during emergency stop of the vehicle C.

The three-dimensional map information 332 includes the intensity information indicating the intensity of the reflected wave corresponding to the reflection point P. The calculation unit 326 calculates the backbone information 334a based on the gravity center position Pc of the intensity in the point group G, which is the group of the plurality of reflection points P, and the position of the upper point P1 located uppermost in the vertical direction in the point group G.

According to such a configuration, since the backbone information 334a is calculated using the gravity center position Pc of the intensity in the point group G, accuracy of the backbone information 334a can be relatively increased.

Second Embodiment

Figure 7:
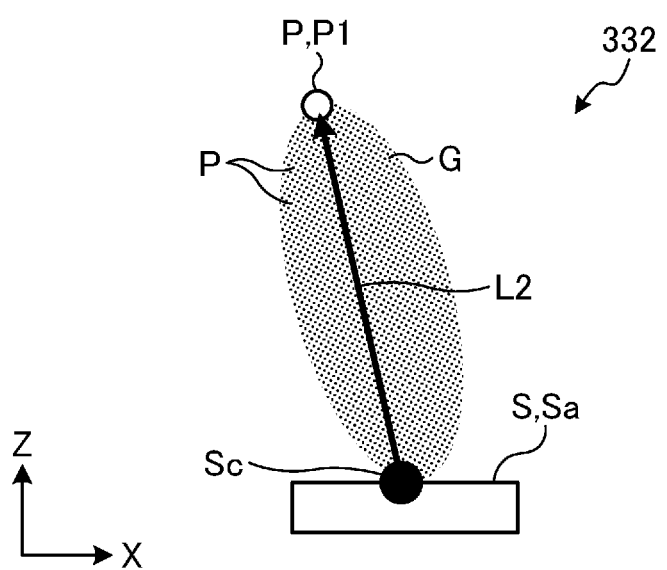
FIG. 7 is a diagram illustrating a method of calculating backbone information according to a second embodiment.

FIG. 7 is a diagram illustrating a method of calculating the backbone information 334a according to a second embodiment.

The second embodiment is different from the first embodiment in the method of calculating the backbone information 334a.

As illustrated in FIG. 7, the calculation unit 326 calculates the backbone information 334a based on a center position Sc of the seat surface Sa and the position of the upper point P1 located uppermost in the vertical direction of the vehicle C in the point group G. Specifically, the calculation unit 326 calculates a line L2 connecting the center position Sc and the position of the upper point P1. The calculation unit 326 regards a length of the line L2 as the length of the backbone Ma, and regards a direction from the center position Sc toward the upper point P1 in the line L2 as the extending direction of the backbone Ma. In FIG. 7, a point indicating the center position Sc and the reflection point P of the upper point P1 are shown larger than the other reflection points P in order to facilitate understanding.

According to such a configuration, since the calculation unit 326 calculates the backbone information 334a based on the center position Sc of the seat surface Sa and the position of the upper point P1 located uppermost in the vertical direction in the point group G, a calculation amount in the calculation of the backbone information 334a can be relatively reduced.

Third Embodiment

Figure 8:
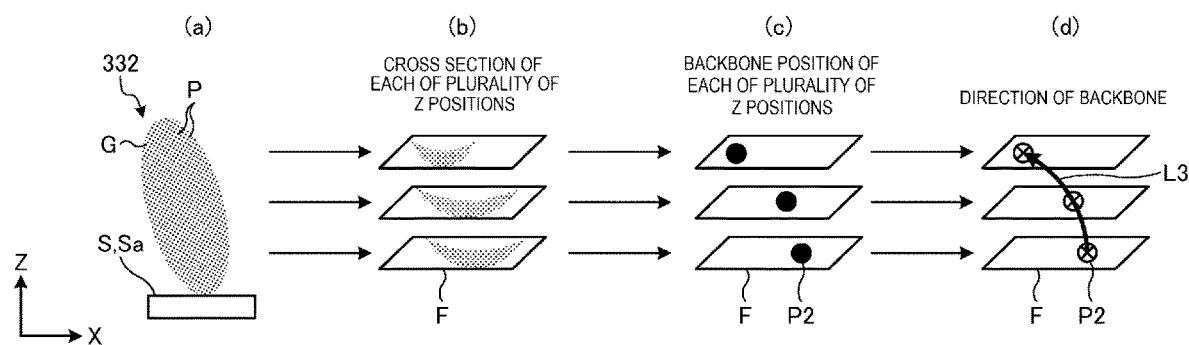
FIG. 8 is a diagram illustrating a method of calculating backbone information according to a third embodiment.
Figure 9:
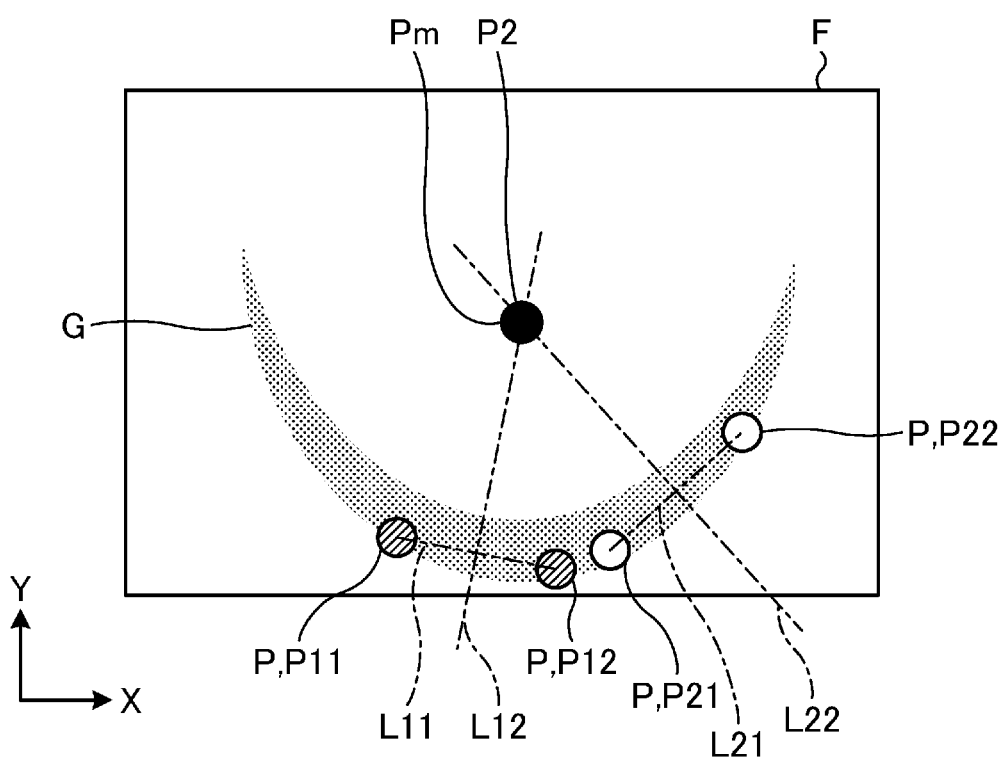
FIG. 9 is a diagram illustrating a method of calculating a backbone position in the method of calculating the backbone information according to the third embodiment.

FIG. 8 is a diagram illustrating a method of calculating the backbone information 334a according to a third embodiment. FIG. 9 is a diagram illustrating a method of calculating a backbone position in the method of calculating the backbone information 334a according to the third embodiment.

The third embodiment is different from the first embodiment in the method of calculating the backbone information 334a.

As illustrated in FIG. 8, the calculation unit 326 extracts, that is, creates a plurality of cross sections F ((b) in FIG. 8) from the point group G ((a) in FIG. 8). The plurality of cross sections F are cross sections orthogonal to the vertical direction of the vehicle C, that is, the Z axis, and positions in the vertical direction of the vehicle C, that is, the positions of the Z axis (also referred to as Z positions) are different from one another.

Next, the calculation unit 326 calculates positions P2 of the backbone Ma on the plurality of cross sections F ((c) in FIG. 8). Specifically, as illustrated in FIG. 9, the calculation unit 326 selects two reflection points P (as an example, reflection points P11 and P12) spaced apart from each other by a specified distance on the cross section F. The reflection points P11 and P12 may be, for example, points that are not aligned in the X direction or the Y direction. The calculation unit 326 calculates a line L11 connecting the two reflection points P11 and P12, and calculates a perpendicular bisector L12 of the line L11. The perpendicular bisector L12 is a line on the cross section F and is orthogonal to the vertical direction of the vehicle C (Z direction). Similarly, the calculation unit 326 selects two reflection points P (as an example, reflection points P21 and P22) that are spaced apart from each other by the specified distance on the cross section F, and that are different from the reflection points P11 and P12. The reflection points P21 and P22 may be, for example, points that are not aligned in the X direction or the Y direction. The calculation unit 326 calculates a line L21 connecting the two reflection points P21 and P22, and calculates a perpendicular bisector L22 of the line L21. The perpendicular bisector L22 is a line on the cross section F and is orthogonal to the vertical direction of the vehicle C (Z direction). The calculation unit 326 calculates an intersection Pm between the two perpendicular bisectors L12 and L22. The calculation unit 326 may regard one intersection Pm as the position P2 of the backbone Ma, may select a plurality of sets of the four reflection points P on the cross section F, and regard an average value of the plurality of sets of the intersections Pm as the position P2 of the backbone Ma. The position of the backbone Ma is also referred to as a cross-sectional center. In FIG. 9, the reflection points P11, P12, P21, and P22 are shown larger than the other reflection points P in order to facilitate understanding.

Returning to FIG. 8, next, the calculation unit 326 calculates the backbone information 334a based on the positions P2 of the backbone Ma of the plurality of cross sections F. Specifically, a line L3 ((d) in FIG. 8) connecting the positions P2 of the backbone Ma of the plurality of cross sections F is calculated. The calculation unit 326 regards a length of the line L3 as the length of the backbone Ma, and regards a direction from the position P2 of the backbone Ma on a lowermost side to the position P2 of the backbone Ma on an uppermost side in the line L3 as the extending direction of the backbone Ma. In the example of FIG. 8, three cross-sections F are used for the calculation of the backbone information 334a, but the number of the cross-sections F is not limited thereto.

As described above, in the third embodiment, the calculation unit 326 calculates the positions of the backbone Ma different in the vertical direction of the vehicle C in the point group G which is a group of a plurality of reflection points P, which are positions in the plurality of cross sections F orthogonal to the vertical direction of the vehicle C. The calculation unit 326 calculates the backbone information 334a based on the positions P2 of the backbone Ma on the plurality of cross sections F.

According to such a configuration, for example, since the calculation unit 326 calculates the backbone information 334a based on the positions P2 of the backbone Ma on the plurality of cross sections F of the point group G, the accuracy of the backbone information 334a (for example, the extending direction of the backbone Ma) can be relatively increased. In addition, according to the above configuration, even when the reflection points P are concentrated on the surface of the occupant M or in the vicinity thereof, the accuracy of the backbone information 334a can be relatively increased.

The program to be executed by the control device 3 may be stored in a computer-readable storage medium such as a CD-ROM, a CD-R, a memory card, a digital versatile disk (DVD), or a flexible disk (FD) as a file in an installable format or an executable format, and provided as a computer program product. Further, the program may be stored in a computer connected to a network such as the Internet and provided by being downloaded via the network. The program may be provided or distributed via the network such as the Internet.

While embodiments disclosed here have been described, these embodiments have been presented by way of example only, and are not intended to limit the scope of the invention. Indeed, the novel embodiments may be embodied in a variety of other forms, and various omissions, substitutions and modifications may be made without departing from the spirit of the invention. The embodiments and modifications thereof are included in the scope and gist of the invention, and are also included in the invention described in the claims and equivalents thereof.

An occupant detection device according to an embodiment includes: a radio wave sensor located above a seat surface of a seat that is disposed in a vehicle cabin of a vehicle, in a vertical direction of the vehicle, and including a transmission unit configured to transmit a transmission wave to the vehicle cabin and a reception unit configured to receive a reflected wave generated by the transmission wave being reflected by an occupant on the seat; a creation unit configured to create, based on the reflected wave, three-dimensional map information in the vehicle cabin in which a position of a reflection point of the reflected wave is represented by three-dimensional coordinates; and a calculation unit configured to calculate, based on the three-dimensional map information, backbone information that is information on a backbone of the occupant on the seat.

According to such a configuration, since the information on the backbone is calculated, that is, detected as information on a body of the occupant on the seat by the calculation unit, a posture and a physique of the occupant can be grasped based on the information on the backbone. Therefore, control related to an occupant protection corresponding to the posture and the physique of the occupant can be performed.

In the occupant detection device, for example, the backbone information includes at least one of a length of the backbone and an extending direction of the backbone.

According to such a configuration, since the length of the backbone corresponds to a sitting height of the occupant, and the sitting height of the occupant corresponds to the physique of the occupant, when the length of the backbone of the occupant on the seat is calculated, the physique of the occupant can be grasped based on the length of the backbone. Therefore, for example, as the control related to the occupant protection, deployment control of an airbag during a collision of the vehicle and fastening control of a seat belt during the collision of the vehicle can be performed. In addition, since the extending direction of the backbone is a direction corresponding to the posture of the occupant (a posture of leaning forward, a posture of sitting and leaning to the left or right, or the like), when the extending direction of the backbone is calculated, the posture of the occupant can be grasped based on the extending direction of the backbone. Therefore, for example, as the control related to the occupant protection, control on a shape of the seat (such as an inclination angle of the seat surface) can be performed in order to reduce an impact during emergency stop of the vehicle.

In the occupant detection device, for example, the three-dimensional map information includes intensity information indicating an intensity of the reflected wave corresponding to the reflection point, and the calculation unit calculates the backbone information based on a gravity center position of the intensity in a point group that is a group of a plurality of reflection points and a position of an upper point located uppermost in the vertical direction in the point group.

According to such a configuration, since the backbone information is calculated using the gravity center position of the intensity in the point group, accuracy of the backbone information can be relatively increased.

In the occupant detection device, for example, the three-dimensional map information includes a position of the seat surface of the seat, and the calculation unit calculates the backbone information based on a center position of the seat surface and a position of an upper point located uppermost in the vertical direction in a point group that is a group of a plurality of reflection points.

According to such a configuration, since the backbone information is calculated based on the center position of the seat surface and the position of the upper point located uppermost in the vertical direction in the point group, a calculation amount in the calculation of the backbone information can be relatively reduced.

In the occupant detection device, for example, the calculation unit calculates positions of the backbone different in the vertical direction in a point group that is a group of a plurality of reflection points, the positions of the backbone being positions in a plurality of cross sections orthogonal to the vertical direction, and calculates the backbone information based on the positions of the backbone in the plurality of cross sections.

According to such a configuration, for example, since the calculation unit calculates the backbone information based on the positions of the backbone in the plurality of cross sections in the point group, the accuracy of the backbone information (for example, the extending direction of the backbone) can be relatively increased.

A method according to an embodiment is a method to be executed by an occupant detection device, the occupant detection device includes: a radio wave sensor located above a seat surface of a seat that is disposed in a vehicle cabin of a vehicle, in a vertical direction of the vehicle, and including a transmission unit configured to transmit a transmission wave to the vehicle cabin and a reception unit configured to receive a reflected wave generated by the transmission wave being reflected by an occupant on the seat, and the method includes: a step of creating, based on the reflected wave, three-dimensional map information in the vehicle cabin in which a position of a reflection point of the reflected wave is represented by three-dimensional coordinates; and a step of calculating, based on the three-dimensional map information, backbone information that is information on a backbone of the occupant on the seat.

According to such a configuration, since the information on the backbone is calculated, that is, detected as the information on the body of the occupant on the seat by the calculation unit, the posture and the physique of the occupant can be grasped based on the information on the backbone. Therefore, the control related to the occupant protection corresponding to the posture and the physique of the occupant can be performed.

A program according to an embodiment causes a computer of an occupant detection device including a radio wave sensor located above a seat surface of a seat that is disposed in a vehicle cabin of a vehicle, in a vertical direction of the vehicle, and including a transmission unit configured to transmit a transmission wave to the vehicle cabin and a reception unit configured to receive a reflected wave generated by the transmission wave being reflected by an occupant on the seat, to function as a creation unit configured to create, based on the reflected wave, three-dimensional map information in the vehicle cabin in which a position of a reflection point of the reflected wave is represented by three-dimensional coordinates, and a calculation unit configured to calculate, based on the three-dimensional map information, backbone information that is information on a backbone of the occupant on the seat.

According to such a configuration, since the information on the backbone is calculated, that is, detected as the information on the body of the occupant on the seat by the calculation unit, the posture and the physique of the occupant can be grasped based on the information on the backbone. Therefore, the control related to the occupant protection corresponding to the posture and the physique of the occupant can be performed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An occupant detection device, comprising:
   a radio wave sensor located above a seat surface of a seat that is disposed in a vehicle cabin of a vehicle, in a vertical direction of the vehicle, and including a transmission unit configured to transmit a transmission wave to the vehicle cabin and a reception unit configured to receive a reflected wave generated by the transmission wave being reflected by an occupant on the seat; and
   at least one processor configured to implement:
      a creation unit configured to create, based on the reflected wave, three-dimensional map information in the vehicle cabin in which a position of a reflection point of the reflected wave is represented by three-dimensional coordinates; and
      a calculation unit configured to calculate, based on the three-dimensional map information, backbone information that is information on a backbone of the occupant on the seat,
   wherein the backbone information includes a length of the backbone and an extending direction of the backbone.

2. The occupant detection device according to claim 1, wherein
   the three-dimensional map information includes intensity information indicating an intensity of the reflected wave corresponding to the reflection point, and
   the calculation unit calculates the backbone information based on a gravity center position of the intensity in a point group that is a group of a plurality of reflection points and a position of an upper point located uppermost in the vertical direction in the point group.

3. The occupant detection device according to claim 1, wherein
   the three-dimensional map information includes a position of the seat surface of the seat, and
   the calculation unit calculates the backbone information based on a center position of the seat surface and a position of an upper point located uppermost in the vertical direction in a point group that is a group of a plurality of reflection points.

4. The occupant detection device according to claim 1, wherein
   the calculation unit calculates positions of the backbone different in the vertical direction in a point group that is a group of a plurality of reflection points, the positions of the backbone being positions in a plurality of cross sections orthogonal to the vertical direction, and calculates the backbone information based on the positions of the backbone in the plurality of cross sections.

5. A method to be executed by an occupant detection device, the occupant detection device including: a radio wave sensor located above a seat surface of a seat that is disposed in a vehicle cabin of a vehicle, in a vertical direction of the vehicle, and including a transmission unit configured to transmit a transmission wave to the vehicle cabin and a reception unit configured to receive a reflected wave generated by the transmission wave being reflected by an occupant on the seat, the method comprising:
   a step of creating, based on the reflected wave, three-dimensional map information in the vehicle cabin in which a position of a reflection point of the reflected wave is represented by three-dimensional coordinates; and
   a step of calculating, based on the three-dimensional map information, backbone information that is information on a backbone of the occupant on the seat,
   wherein the backbone information includes a length of the backbone and an extending direction of the backbone.

6. A non-transitory computer recordable medium storing a program causing a computer of an occupant detection device, the occupant detection device including a radio wave sensor located above a seat surface of a seat that is disposed in a vehicle cabin of a vehicle, in a vertical direction of the vehicle, and including a transmission unit configured to transmit a transmission wave to the vehicle cabin and a reception unit configured to receive a reflected wave generated by the transmission wave being reflected by an occupant on the seat, to implement:
   a creation unit configured to create, based on the reflected wave, three-dimensional map information in the vehicle cabin in which a position of a reflection point of the reflected wave is represented by three-dimensional coordinates; and
   a calculation unit configured to calculate, based on the three-dimensional map information, backbone information that is information on a backbone of the occupant on the seat,
   wherein the backbone information includes a length of the backbone and an extending direction of the backbone.

* * * * *